Patented Feb. 26, 1924.

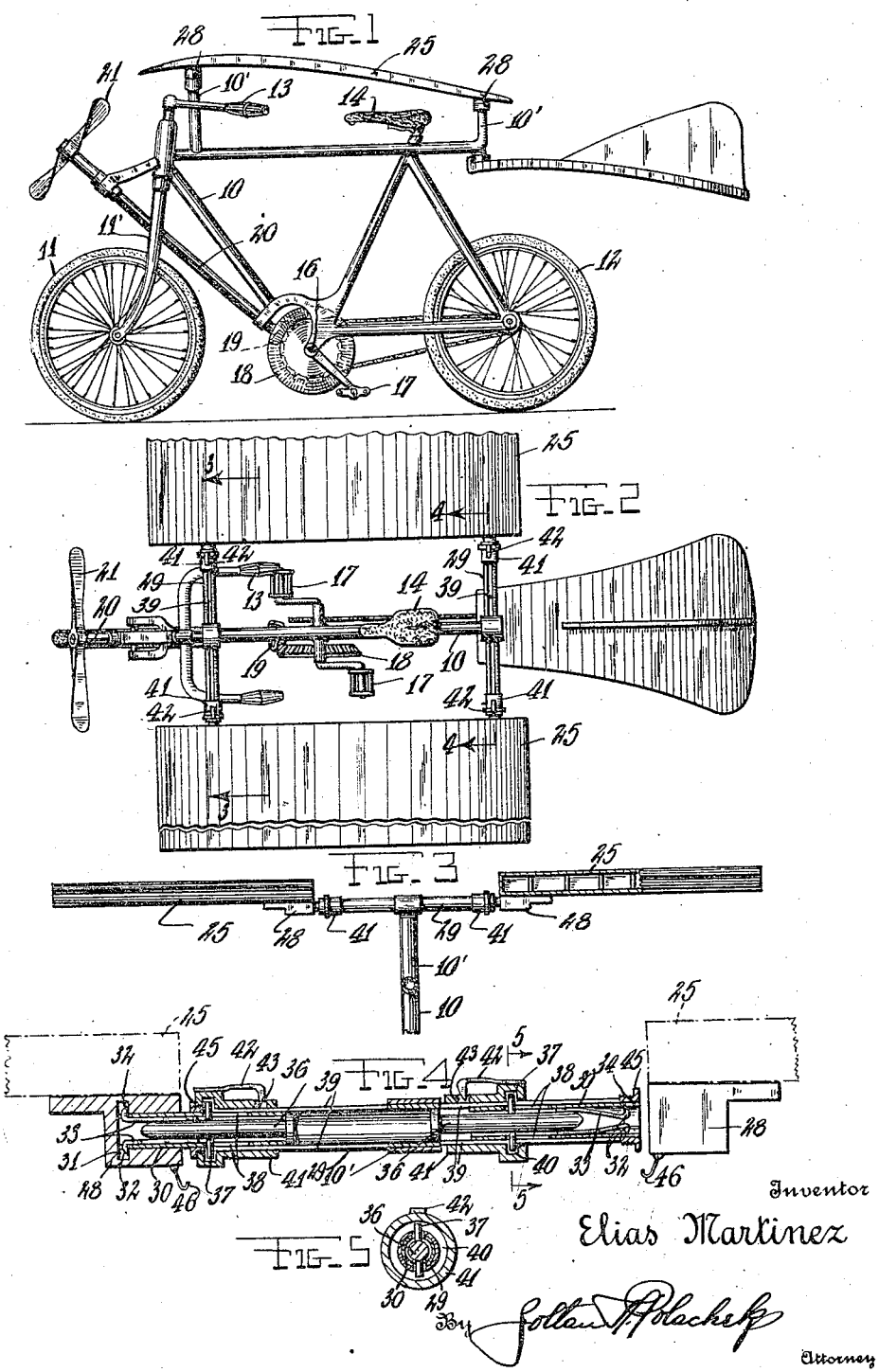

1,485,335

UNITED STATES PATENT OFFICE.

ELIAS MARTINEZ, OF PORT ARTHUR, TEXAS.

MANUAL BICYCLE AEROPLANE.

Application filed July 6, 1923. Serial No. 649,836.

*To all whom it may concern:*

Be it known that I, ELIAS MARTINEZ, a citizen of Mexico, residing at Port Arthur, in the county of Jefferson and State of Texas, have invented certain new and useful Improvements in Manual Bicycle Aeroplanes, of which the following is a specification.

This invention relates generally to aeronautical machines and may be embodied in an aeroplane mounted on a bicycle frame for manual operation, as here shown, or the features of demountable wings may be embodied in any aeroplane.

The invention has for an object the provision of a novel machine of this type having sustaining wings which can be readily demounted to be folded along the machine when not in use.

For further comprehension of the invention, and of the objects and advantages thereof, reference will be had to the following description and accompanying drawings, and to the appended claims in which the various novel features of the invention are more particularly set forth.

Fig. 1 of the drawings is a side elevation of my improved machine.

Fig. 2 is a plan view thereof.

Fig. 3 is a fragmentary transverse sectional view taken on the line 3—3 of Fig. 2.

Fig. 4 is a detail sectional view taken on the line 4—4 of Fig. 2.

Fig. 5 is a transverse sectional view on the line 5—5 of Fig. 4.

As here embodied my improved machine comprises a frame 10 such as commonly provided in bicycles and which is supported on the front and rear wheels 11 and 12 respectively, the front wheel being dirigible by the usual handle 13. Upon the frame 10 is a seat 14 for the operator. Suitably journaled in the frame, between the two wheels, is a stub shaft 16 on which is fixed a pair of crank pedals 17 for rotation and which has also rigid thereon a bevel gear 18 meshing with a bevel pinion 19 on the rear end of a forwardly and upwardly extending shaft 20 which has a helical propeller 21 on its forward end adapted for rotation by the feet of the operator as will be understood. This shaft 20 is suitably supported by the frame 10 and passes between the legs of the steering fork 11' which are spaced sufficiently far apart to accommodate it.

I also provide a pair of transversely extending wings or sustaining planes 25 which are spaced laterally apart from one another a sufficient distance to allow of the body of the operator being accommodated therebetween. These wings are demountable so that they may be readily hung to the sides of the frame when the machine is traveling along a road.

To support the wings I provide slidable bolts which are adapted to be moved laterally of the machine into sockets 28 on the undersides of the wings. As here shown these bolts are carried in tubular members 29 extending transversely of the machine one behind the seat 14 and the other near the front of the machine, these tubes being supported by extensions 10' from the frame 10. The bolts are indicated at 30 and are in the form of sleeves slidable in the tube 29 and which project at their outer ends into the sockets 28. Each of the latter is formed at its inner end with an enlargement 31 providing a shoulder which is engaged by hooks 32 carried on the free ends of resilient straps 33 riveted at one end to the bolts 30 inside the latter. Normally these hooks are drawn back within the circular confines of the bolts. The bolts have notches 34 in their forward end to accommodate the hooks. To move these hooks to locking position I provide the plungers 36 which are slidable in the bolts and have pointed forward ends adapted to engage the members 33 to move the hooks 32 to locking position.

Fixed to these plungers 36 are the transversely projecting pins 37 which extend through short longitudinal slots 38 in the bolts and longer longitudinal slots 39 in the tubular bolt support 29. The outer ends of these pins project into annular recesses such as 40 in the inner faces of collars 41 surrounding the tube 39, whereby longitudinal movement of the collars moves the plungers 36. The collars 41 are interiorly screwthreaded at their forward ends, while the ends of the tubes 29 are also exteriorly screw-threaded. Mounted on the collars are spring hooks 42 which are adapted to project through apertures 43 in the collars, through one of the slots 39 and engage behind the bolts 30 to cause the forward movement of the collars along the tube to be imparted to the bolts.

The manner in which this wing locking element operates is as follows: Assuming the parts in the inoperative position shown at the right of Fig. 4, the hook 42 is pressed inwardly by hand to engage behind the bolt 30. The collar 41 is then slid along the tube 29 toward the end thereof, carrying with it both the bolt 30 and the plunger 36, until the bolt is properly inserted in the socket 30. The hook 42 is then released, and further forward movement of the collar 41 on the tube 29 carries the plunger pin 36 alone, the pin 37 passing along the slots 38. The threads on the collar finally engage the threads on the tube 29 and the collar is screwed against a flange 45 on the end of the tube thus locking the hooks 32 in position preventing withdrawal of the bolt. When the wings are to be demounted the above operations are reversed and the bolts withdrawn from the sockets. Hooks 46 may be attached to the sockets to be engaged in suitable members on the frame to suspend the wings therefrom.

Having thus described my invention what I claim as new and desire to protect by Letters Patent of the United States is as follows:

1. In an aeronautical machine, a pair of wings, socket elements thereon, a vehicle, and bolts carried by said vehicle adapted to engage in said sockets to attach the wings to the vehicle, said bolts having transversely movable hooks adapted to engage shouldered elements in the sockets to hold the bolts against displacement from the sockets.

2. In an aeronautical machine, a pair of wings, socket elements thereon, a vehicle and bolts carried by said vehicle adapted to engage in said sockets to attach the wings to the vehicle, tubes slidably supporting said bolts, said bolts being in the form of sleeves in said tubes, resiliently mounted hooks in said sleeves adapted to engage shouldered elements in said sockets to hold the bolts against withdrawal, and plungers carried in the sleeves for moving said hooks to operative position.

3. In an aeronautical machine, a pair of wings, socket elements thereon, a vehicle and bolts carried by said vehicle adapted to engage in said sockets to attach the wings to the vehicle, tubes slidably supporting said bolts, said bolts being in the form of sleeves in said tubes, resiliently mounted hooks in said sleeves adapted to engage shouldered elements in said sockets to hold the bolts against withdrawal, and plungers carried in the sleeves for moving said hooks to operative position, and collars surrounding said tubes and engaged with said plungers to move the latter longitudinally in the said sleeves.

In testimony whereof I have affixed my signature.

ELIAS MARTINEZ.